United States Patent
Hollstein et al.

[11] Patent Number: 6,123,155
[45] Date of Patent: Sep. 26, 2000

[54] CONTROL SYSTEM FOR POWER TAKE-OFF SHAFTS

[75] Inventors: Jürgen Hollstein, Mannheim; Ludwig Ordelt, Grünstadt/Sausenheim, both of Germany

[73] Assignee: Deere & Company, Moline, Ill.

[21] Appl. No.: 09/203,079

[22] Filed: Dec. 1, 1998

[30] Foreign Application Priority Data

Dec. 6, 1997 [DE] Germany ................ 197 54 233

[51] Int. Cl.$^7$ ..................................... A01B 41/06
[52] U.S. Cl. ........................... 172/2; 172/4; 37/348
[58] Field of Search ....................... 37/348; 172/2, 172/3, 4, 4.5, 6, 7, 9; 280/912; 364/424.07; 180/233, 297, 282, 285

[56] References Cited

U.S. PATENT DOCUMENTS 4,747,462  5/1988  Herrmann et al. .
4,967,868  11/1990  Schwarz et al. .
5,558,163  9/1996  Hollstein .

Primary Examiner—Robert E. Pezzuto

[57] ABSTRACT

A control system controls the actuation of a plurality of control devices of a utility vehicle, including a PTO shaft control device. The control system includes a control unit which is electrically connected to the control devices and to switches for the manual actuation of the control devices. One of the switches is an automatic mode switch which controls activation of an automatic mode wherein the control unit automatically controls the control devices. In response to signals from a hitch switch, the control system transmits control signals to a hitch control which controls raising and lowering of an implement hitch. When the automatic mode is activated the control unit automatically disengages the PTO shaft if the hitch is raised above a pre-set hitch position. The control unit is also connected to an enable switch, and when the automatic mode is activated, the control unit automatically engages the PTO shaft if the enable switch is actuated approximately simultaneously with a lowering command generated by the hitch switch.

10 Claims, 3 Drawing Sheets

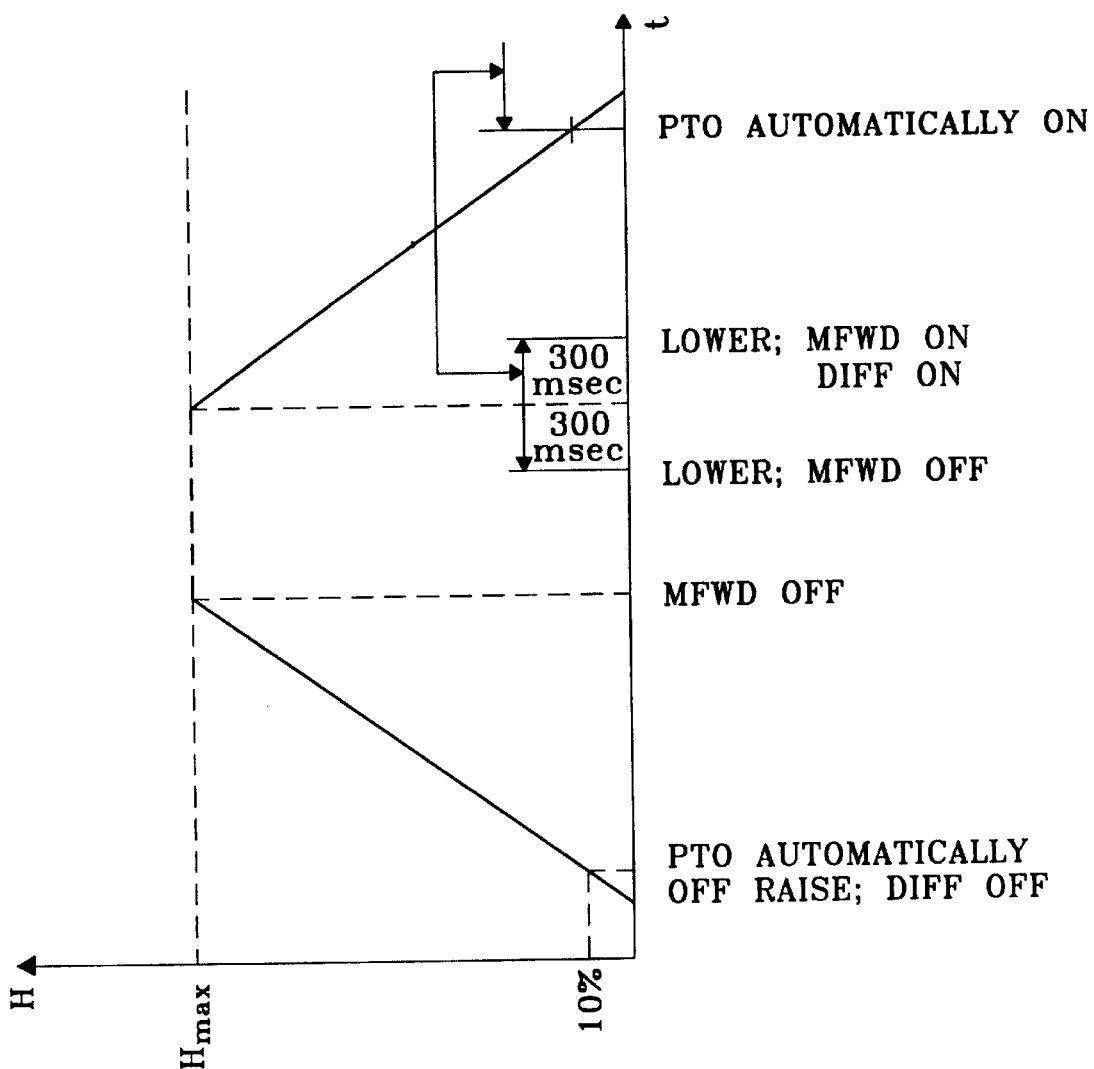

CONTROL SYSTEM FOR POWER TAKE-OFF SHAFTS

BACKGROUND OF THE INVENTION

The invention relates to a control system for controlling the operation of a power take-off (PTO) shaft control device and, if applicable, other control devices of a utility vehicle. The control system includes a control unit that is electrically connected to the control devices, to switch s or switches for the manual control of the control devices and to an automatic mode switch to activate or deactivate an automatic mode for the automatic control of the control devices. In response to signals from a hitch switch, the control system transmits control signals for raising and lowering an attached implement hitch. The control unit automatically disengages the PTO shaft when the automatic mode is activated, as long as a pre-set hitch position is exceeded upon raising the attached implement hitch.

Such a control system is shown in U.S. Pat. No. 5,558,163, issued Sep. 24 1996 and assigned to the assignee of this application (Atty. Docket No. 8678). In this control system a number of switch controlled operations, such as PTO shafts, differential lock and all-wheel drive, are controlled in an automatic sequence depending upon the position of the hitch. When an automatic mode is activated, the operations are disengaged according to a pre-set program when the hitch is raised, and re-engaged when the hitch is lowered. Thus, during the preparation for a turn, the number of manual operations can be reduced considerably. For safety reasons the PTO shaft, however, is not automatically re-engaged during hitch lowering. Rather, the PTO shaft is re-engaged manually with a PTO shaft switch. Finding the correct point in time for the engagement of the PTO shaft requires concentration and skill on the part of the operator. Too early engagement can overload or damage the PTO shaft and the attached transmitting linkage, since at that point the implement is raised out of the ground considerably and the PTO shaft connection is angled sharply. Furthermore, when the PTO shaft is rotating the fully raised implement can eject dirt particles that can be dangerous. If the PTO shaft is engaged too late, the implement is already in contact with the ground or the plants that are to be worked. This makes difficult or prevents the running of the PTO shaft.

SUMMARY OF THE INVENTION

An object of the present invention is to provide such a control system which relieves the burden on the operator during the engagement of the PTO shaft without neglecting safety concerns.

This and other objects are achieved by the present invention wherein a control system includes an enable switch which is electrically connected to a control unit. The control unit includes means that automatically engage the PTO shaft when the automatic mode is activated, if the enable switch is actuated approximately simultaneously with a lowering command delivered by the hitch switch.

The PTO shaft is also included in the automatic sequence during rapid lowering of the implement hitch, so that the PTO shaft is automatically engaged by the control unit. The operator need not observe the position of the implement hitch for the engagement of the PTO shaft. It is only necessary to actuate simultaneously the hitch switch, which initiates the rapid lowering process of the implement hitch, and the enable switch. Thereby the re-engagement of the PTO shaft requires neither the particular attention nor a special skill on the part of the operator.

This control system is safe and operator friendly. The operator knows at all times how the implement is behaving. Improper operation with serious consequences due to insufficient experience, misunderstanding and lack of concentration are unlikely. The system operations and the switch s can be represented uniquely and in a self-explanatory manner so that the operations can be performed easily. Assurance is also provided that during system or component failure the system is brought into a pre-set safe condition.

Depending upon the position of the hitch, the PTO shaft need not be automatically disengaged upon the raising of the hitch. It is also possible, for example, to disengage the PTO shaft automatically, if a pre-set time span has elapsed (which may be zero in the extreme case), after a hitch raising signal has been generated.

In a preferred embodiment of the invention, the PTO shaft is automatically engaged when, during hitch lowering, the position of the implement hitch has reached a pre-set percentage of its maximum lifting angle. This lifting angle corresponds appropriately to a lifting height at which the implement has been raised out of the ground or out of the operating region. It preferably amounts to approximately 10% of its maximum lifting angle, and equals the lifting angle at which the PTO shaft is disengaged during the raising of the implement hitch.

It is not possible to actuate the enable switch at the exact same instant as the hitch switch. Therefore, the invention only demands that actuation should occur approximately at the same time. Preferably, a window of time is established within which an actuation of the enable switch must occur, in order to perform the automatic engagement of the PTO shaft. The enable switch must be actuated within a pre-set time interval before and/or after the point in time of the issuance of the lowering command from the hitch switch. Preferably this time interval lies within a time span of 300 milliseconds before to 500 milliseconds after the issuance of the lowering command.

For safety reasons, it is advantageous to keep the PTO shaft continuously engaged and not automatically disengage it again after its start, only if the enable switch is held in its actuated condition until the PTO shaft has started running. Alternatively, a renewed actuation of the enable switch during or shortly after the start-up of the PTO shaft could be demanded for the continuous engagement.

The engagement of the PTO shaft is also a function of the implement hitch position.

For example, the PTO shaft is maintained engaged only if the enable switch has been actuated or is actuated during the lowering of the implement hitch below a pre-set position of the hitch. This means that the enable switch is either held in its actuated condition until the implement hitch has been lowered to a pre-set hitch position, or it is actuated anew at or after reaching this hitch position.

Preferably, the enable switch is a normally-open pushbutton switch. During the system initialization the pushbutton switch is open. It is active only when the automatic mode is activated and the PTO shaft is incorporated into the automatic mode. This makes it possible to place the system into a previously defined safe condition, in case of component and system failure. Furthermore, for safety reasons the enable switch may be actuated to disengage the PTO shaft at any time. However, the enable switch can be used to re-engage the PTO shaft only as described above. In order to simplify an approximately simultaneous actuation of the hitch switch and the enable switch, these two switch s are arranged in close proximity to each other, so that they can be reached simultaneously with one hand.

The control unit is electrically connected to a PTO shaft switch, a PTO shaft control device, a differential lock switch, a differential control device, a four-wheel drive switch and a four-wheel drive control device. The control unit, in response to actuation of the switches, will execute an automatic control mode, wherein the control devices are controlled automatically according to a pre-set program depending on the position of the hitch.

For reasons of safety, a rotational speed sensor or a vehicle speed sensor is provided. The control unit includes means that permit an automatic incorporation of functions upon the lowering of the implement hitch only when the sensed vehicle speed does not fall below a pre-set lower value, for example, 0.5 Km/h and or when it does not exceed a pre-set upper value, for example, 12 Km/h. Thus, the automatic mode cannot be performed at too high and/or too low a speed.

BRIEF DESCRIPTION OF THE DRAWINGS

FIG. 3 is a diagram illustrating a time sequence of the lifting position of the attached implement hitch.

DETAILED DESCRIPTION

Figure 1:
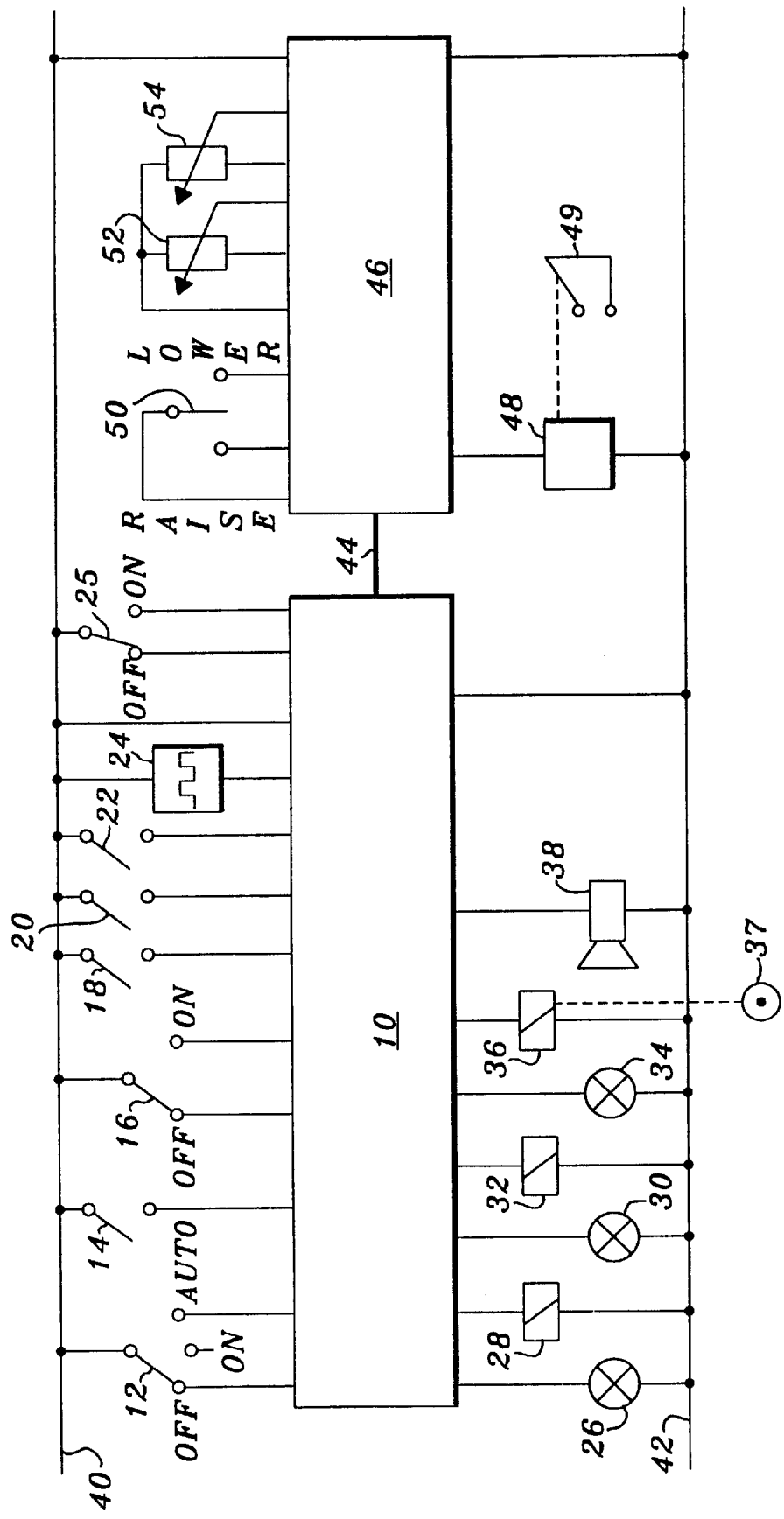
FIG. 1 is a schematic circuit diagram of a control system according to the invention.

The control system shown in FIG. 1 includes an electronic control unit 10, whose functions and inputs can be programmed and that includes a permanent memory for the storage of values. The control unit 10 also includes signal processors control relays and the like (not shown), that are used for the electrical conformity of the attached components. FIG. 1 shows such components as would be necessary or appropriate for the control system according to the invention. However, the control unit may contain further connections and functions.

The control unit 10 is connected with a four-wheel drive switch 12, a differential lock switch 14, a PTO shaft switch 16, an automatic mode switch 18, two brake switches 20, 22, a vehicle speed sensor 24, an enable switch 25, a four-wheel drive indicator light 26, a four-wheel drive electromagnetic control valve 28, a differential lock indicator light 30, a differential lock electromagnetic control valve 32, a PTO shaft indicator light 34, a PTO shaft electromagnetic control valve 36 and an acoustic warning arrangement 38. The control unit 10 is connected by conductors 40, 42 to the two poles of a vehicle battery (not shown).

The four-wheel drive switch 12 can be actuated manually into stable switch positions. In the OFF or ON positions the four-wheel drive electromagnetic control valve 28 is actuated in order to disengage or engage the mechanical front wheel drive of the driveline. In the AUTO (automatic mode) position the four-wheel drive electromagnetic control valve 28 is automatically controlled depending on the vehicle speed, the steering angle, actuation of the brakes and/or actuation of the clutch etc., as has been described, for example, in U.S. Pat. No. 4,747,462, issued May 31, 1988, U.S. Pat. No. 4,967,868, issued Nov. 6, 1990 (Atty. Docket 8404) and German patent DE 38 37 357, published Oct. 5, 1990 (Atty. Docket 8468), all assigned to the assignee of this application.

The differential lock switch 14 is a push-button switch through which the operator can transmit control signals to the differential lock electromagnetic control valve 32 for the actuation of the rear axle differential.

The PTO shaft switch 16 is a manually operated toggle switch that can be switched between an ON position and an OFF position that is used to control the PTO shaft electromagnetic control valve 36.

The automatic mode switch 18 is a manually operated push-button switch through which control signals can be transmitted to the control unit 10 that switch the control unit 10 between a normal operating mode and an automatic mode.

The two brake switches 20 and 22 are connected to the vehicle service brakes, not shown, and are actuated by the application of the brakes.

The enable switch 25 is a manually operated, normally open, push-button switch. It is located near the automatic mode switch 18, so that the operator can simultaneously actuate both switches 18, 25 with one hand. By actuating the enable switch 25 at the appropriate point in time, or in the appropriate time interval, the PTO shaft 37 can be incorporated into the automatic sequence, even during the lowering of an implement hitch 49.

The four-wheel drive indicator light 26, the differential lock indicator light 30 and the PTO shaft indicator light 34 indicate the operational status of the four wheel drive (not shown), the differential lock (not shown) and the PTO shaft (not shown). If the indicator lights 26, 30, 34 are continuously on or off, they indicate that the associated functions are switched on or off in normal operating mode. The indicator lights 26, 30, 34 may also be flashing in bright flashing mode or in dim flashing mode. The bright flashing mode indicates that the automatic mode is activated and that the function incorporated into the automatic mode can be switched on. The dim flashing mode indicates that the automatic mode is activated and that the function incorporated into the automatic mode is switched off.

The four-wheel drive electromagnetic control valve 28, the differential lock electromagnetic control valve 32 and the PTO shaft electromagnetic control valve 36 are each connected to a corresponding electro-hydraulic clutch (not shown) of the associated four wheel drive, differential lock and PTO shaft 37, respectively.

The control unit 10 is connected via a serial bus 44 with the control system 46 for a control valve 48 of an implement hitch 49. The control valve 48 controls the flow of hydraulic fluid from and to the lifting cylinders of the implement hitch 49, in order to raise or lower it.

The control system 46 of the implement hitch 49 is also connected to the vehicle battery cables 40, 42 and is connected to an operating switch 50. Switch 50 is preferably a spring-centered three-position toggle switch, through which the operator can transmit signals for the rapid lifting or lowering of the implement hitch 49. A position transducer 52, connected to the implement hitch 49, and a position limit value transducer 54 are connected to the control system 46 of the implement hitch 49. The position transducers 52, 54 may be adjustable potentiometers. The position transducer 52 transmits a signal corresponding to the position of the hitch. The position limit value transducer 54 can manually adjusted to supply an upper limit position value for the implement hitch 49. Further details of such a hitch control system may be found in European patent application EP-A-0 428 076. The control unit 10 executes the control logic illustrated by the condition diagram of FIG. 2 and is further described in greater detail in European patent application EP- A-0 696 303. This control logic can be supplemented by further appropriate functions if necessary. The hitch switch 50 and the enable switch 2 are preferably arranged in close proximity to each other so that they can be actuated simultaneously with one hand.

Figure 2:
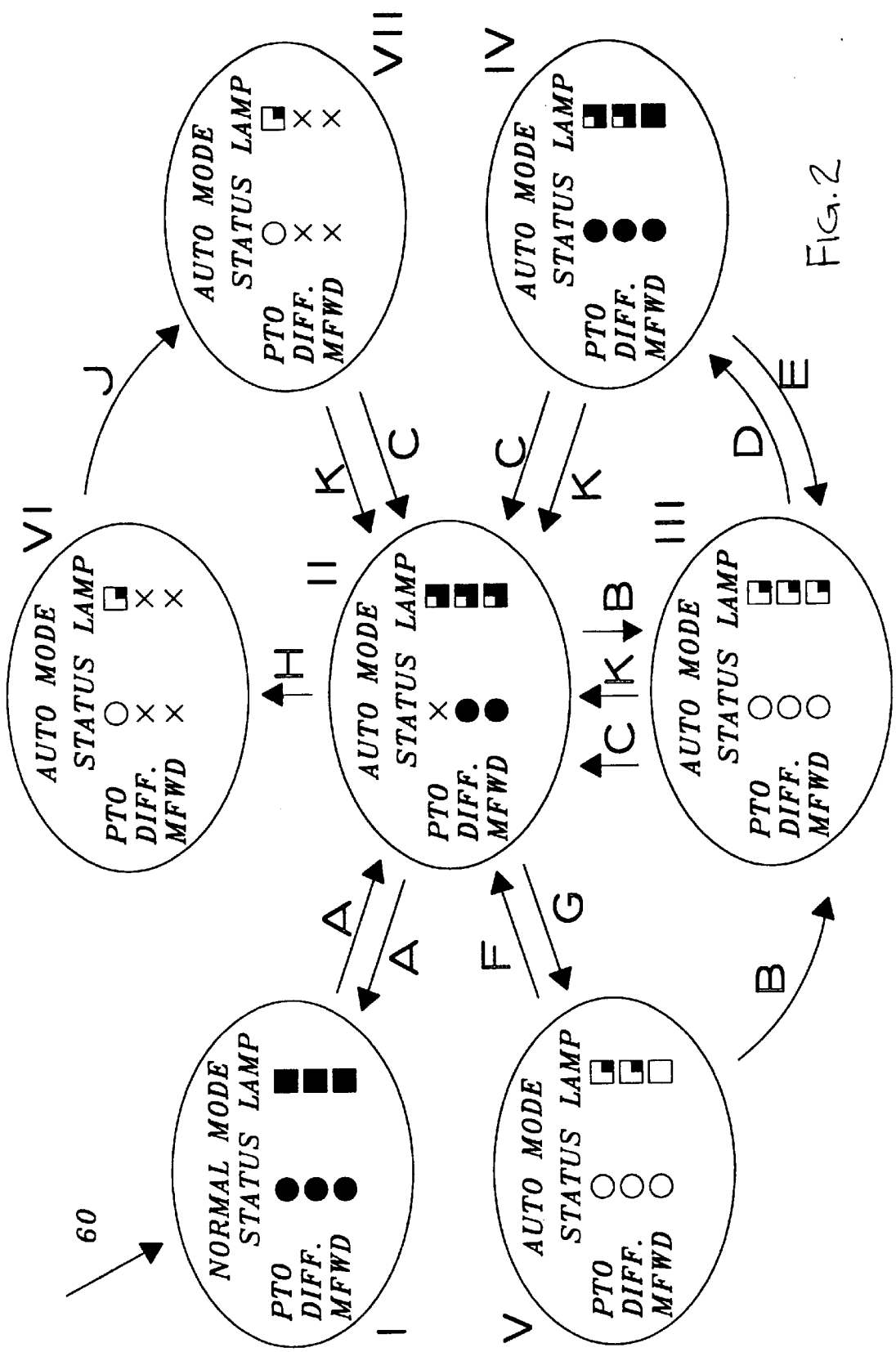
FIG. 2 is a diagram illustration the various operational modes of the control system of FIG. 1.

FIG. 2 illustrates seven operational modes of the control system, modes I–VII, in which the following functions are controlled: the PTO shaft 37 (PTO), the rear axle differential (DIFF), and the mechanical front wheel drive (MFWD).

The status of the functions are illustrated with empty or filled circles and crosses. A filled circle indicates that the function has been engaged. An empty circle indicates that it is disengaged. A cross indicates that the function remains in the condition that it occupied before the last change in condition.

The functions are associated with indicator lights ("lamps") that are symbolized by squares. A filled or empty square indicates that the indicator light is continuously on or off. A square filled only in the right lower corner shows that the indicator light is flashing in a dim or low duty cycle flashing mode, such as being off for 90% and on for 10% of each 1 second period. If the square is filled up to its upper left corner, the indicator light flashes in bright or high duty cycle flashing mode, such as being 10% and on for 90% of each 1 second period.

In the normal mode the functions can be engaged by means of the switches 12, 14 and 16 by the operator. In the automatic mode, on the other hand, the functions are additionally engaged according to a pre-set program.

FIG. 2 shows an initial normal mode I that is activated with the start of ignition (arrow 60). In mode I the hitch is in its lower position and the switches 12, 14 and 16 are energized, so that in the normal operating mode shown all three functions are energized and the associated indicator light 26, 30 and 34 are lit. The initial conditions for the three functions that are selected here are merely exemplary, and other conditions (not shown) are also possible, which correspond to differing switch positions and in which one or more of the functions are disengaged. If one of the functions is de-energized in one of the possible initial conditions, but is not shown, then it is not automatically energized in the conditions II through VII, in which the automatic mode is activated.

Through a single actuation of the automatic mode switch 18 (arrow A) the system changes into the stand-by mode II, in which the automatic mode is active, but the pre-set program is not yet executed. The functions remain energized and the indicator lights are flashing in bright flashing mode. By renewed actuation of the automatic mode switch 18 the system returns to its initial condition I.

Starting from the stand-by condition II, for example at the end of the field, if a RAISING signal is transmitted by the operating switch 50 (arrow B), then the system goes into the raising condition III, after a pre-set program is executed. The RAISING signal causes initiation of the raising of the hitch 49 from its operating position into its transport position. Simultaneously, the differential lock is disengaged so that the vehicle may be turned. If the hitch 49 reaches a pre-set position sensed by the position transducer 52 (pre-set percentage of the maximum drifting angle above the operating height), then the PTO shaft 37 is disengaged. As soon as the position of the hitch 49 has reached a maximum lifting position, which can be pre-set by the position limit value transducer 54 (reaching the transport position), the front wheel drive is disengaged. In case not all of the functions noted were active at the actuation of the automatic mode switch 18, the control unit 10 executes a correspondingly reduced automatic program. By generating a LOWERING signal (arrow C) the system returns from its raising condition III into its stand-by condition II. At that time the PTO shaft 37 remains disengaged. It can be engaged manually at any time by the PTO shaft switch 16. But if simultaneously with the generation of the LOWERING signal (actuation of the operating switch 50) the enable switch 2 is also actuated (arrow K), then, according to the invention, with the return to the stand-by condition II there also occurs an automatic engagement of the PTO shaft. This procedure is symbolized by a cross in the circle in the stand-by condition II.

The actuation of the functions can be overridden when the automatic mode is activated. Thus, it is possible, for example, starting from the raising condition III in which all functions are disengaged, to engage one or more of the functions by actuating the switches 12, 14 and/or 16. If, for example, all functions are manually engaged (arrow D) the condition IV is reached. By disengaging all functions (arrow E) the system returns to the raising condition III. Starting from the condition IV, if the hitch 49 is lowered (arrow C), then the system goes into the stand-by condition II, in which the differential lock and the front wheel drive are automatically engaged. In this case, however, with the return into the stand-by condition II, the PTO shaft 37 is then automatically engaged again, if approximately simultaneously with the generation of the LOWERING signal the enable switch 2 is also actuated (arrow K).

It is also possible, starting from the stand-by condition II, in which all functions are engaged, to disengage one or more of the functions by actuating the switches 12, 14 and/or 16. If, for example, all functions are manually disengaged (arrow G) then the system reaches the condition V. By manually engaging all functions (arrow F), the system returns to the stand-by condition II, in which all functions including the PTO shaft 37 are again engaged. Starting from the condition V, if the hitch 49 is raised (arrow B), then the system goes into its raising condition III.

The functions of the four wheel drive are incorporated into the automatic mode only if the four wheel drive switch 12 is in its AUTO position when the automatic mode is activated. In this case, however, the automatic mode is overridden by an application of the brakes or by shifting the four wheel drive switch 12 into its ON or OFF position. Upon braking the four wheel drive is automatically engaged and the associated indicator light 26 is lit continuously. Upon releasing the brakes or upon changing the four wheel drive switch 12 into its AUTO position the four wheel drive function is again incorporated into the automatic mode in the proper time and condition.

For reasons of safety, a rotational speed sensor or a vehicle speed sensor 24 is provided. The control unit 10 preferably permits automatic control upon the lowering of the implement hitch only when the sensed vehicle speed does not fall below a pre-set lower value, for example, 0.5 Km/h and or when it does not exceed a pre-set upper value, for example, 12 Km/h. Thus, the automatic mode cannot be performed at too high and/or too low a speed. For example, if the hitch 49 is raised at a vehicle speed that is greater than, for example, 12 Km/h (arrow H), then the system goes from its stand-by condition II into the high speed condition VI, in which the PTO shaft 37 is disengaged, but the status of the remaining functions is maintained. If the vehicle speed again falls below 12 Km/h (arrow J), then the system goes into condition VII, without any change in the status of the function or of the indicator light mode. From the condition VII the system returns to its stand-by condition II upon lowering of the hitch 49 (arrow C). In this case, with the return to the stand-by condition II, the PTO shaft 37 is also automatically again engaged if approximately at the same time as the LOWERING signal the enable switch 2 is also actuated (arrow K).

FIG. 5 shows schematically the variation with time of the lift position H of the implement hitch 49 during raising and lowering. Manually generating a RAISING signal with the switch 50 causes a rapid lifting of the implement hitch 49. Approximately simultaneously with the RAISING signal, as signal is applied to the differential lock valve 32 to automatically disengage the differential lock (not shown). When the implement hitch reaches 10% of its maximum lift position Hmax, then the PTO shaft 37 is automatically disengaged. When the maximum lift position Hmax is reached the front wheel drive is automatically disengaged. A rapid lowering of the implement hitch 49 is performed upon a LOWERING signal from the operating switch 50. With the LOWERING signal the differential lock and the front wheel drive are engaged, but not the PTO shaft 37.

At any time after the LOWERING signal the PTO shaft 37 can be engaged manually by actuating the PTO shaft switch 16.

However, the PTO shaft 37 is automatically engaged only if the enable switch 25 is actuated essentially simultaneously with the operating switch 50 and remains actuated until the PTO shaft 37 has started running. The enable switch 25 must be actuated within a time interval Z, that extends from 300 msec. before to 500 msec. after the issuance of the LOWERING signal. In many applications it may be appropriate to pre-set shorter time limits for the time interval. Under these conditions the PTO shaft 37 starts running, as soon as the implement hitch 49 has been lowered to 10% of its maximum lifting position Hmax. If the actuation of the enable switch 25 is interrupted too early, then the PTO shaft 37 does not start running. A PTO shaft 37 that is running can be disengaged at any time by actuating the PTO shaft switch 16 or the enable switch 25.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims. For example, it may be sufficient to actuate only the enable switch 25 essentially simultaneously with the operating switch 50, without holding the enable switch in its actuated position until the PTO shaft 37 has started running. It may also be appropriate to provide that the enable switch 2 must be actuated within a pre-set time interval after the PTO shaft 37 starts running (for example, until the operating height of the implement hitch 49 has been reached), in order to prevent an automatic disengagement of the PTO shaft 37. Furthermore, it is also advantageous that the control unit 10 perform an error or defect checking program in order to prevent an automatic engagement of the PTO shaft 37 in the case of system failures in the area of the hitch or in automatic operation.

We claim:

1. A control system for controlling a plurality of control devices of a utility vehicle, including a power take off (PTO) shaft control device, the control system including a control unit electrically connected to the control devices, to a plurality of switches for the manual control of the control devices, to an automatic mode switch for activating and deactivating an automatic mode for the automatic control of control devices and to a hitch control unit, the hitch control unit controlling an implement hitch in response to a hitch switch, the control unit having means for automatically disengaging the PTO shaft when the automatic mode is activated, if, upon raising of the hitch, a pre-set hitch position is exceeded or a pre-set time interval has elapsed, characterized by:

an enable switch electrically connected to the control unit; and the control unit comprising means operable when the automatic mode is activated, for automatically engaging the PTO shaft if the enable switch is actuated approximately simultaneously with a lowering command generated by the hitch switch.

2. The control system of claim 1, further comprising:

means for automatically engaging the PTO shaft when, upon lowering of the hitch, the position of the hitch reaches a pre-set percentage, approximately 10%, of its maximum lifting angle.

3. The control system of claim 1, further comprising:

means for preventing automatic engagement of the PTO shaft unless the enable switch is actuated within a pre-set time interval of the point in time of the generation of the lowering command.

4. The control system of claim 3, wherein:

the time interval extends from 300 miliseconds before to 500 miliseconds after the generation of the lowering command.

5. The control system of claim 1, further comprising:

means for maintaining the PTO shaft in engagement only if the enable switch has been actuated or is actuated upon initiation of running of the PTO shaft.

6. The control system of claim 1, further comprising:

means for maintaining the PTO shaft in engagement only if, upon lowering the implement hitch below a pre-set hitch position, the enable switch remains actuated or is again actuated.

7. The control system of claim 1, wherein:

the enable switch comprises a normally-open push-button switch.

8. The control system claims 1, wherein:

the control unit comprises means for disengaging the PTO shaft in response to an actuating signal of the enable switch.

9. The control system of claim 1, comprising:

a four wheel drive switch, a differential lock switch and a PTO shaft switch;

the plurality of control devices include a differential lock control device and a four wheel drive control device; and the control unit comprises means for activating the automatic mode depending on the actuation of the switches, wherein the control unit automatically controls the control devices according to a pre-set program depending upon the position of the hitch.

10. The control system of claim 1, further comprising:

a vehicle speed sensor connected to the control unit, the control unit comprising means for permitting an automatic engagement of the control devices upon lowering of the implement hitch only if the sensed vehicle speed falls within a pre-set range of speeds.

* * * * *